United States Patent [19]

Satoh et al.

[11] Patent Number: 4,737,444

[45] Date of Patent: Apr. 12, 1988

[54] OPTICAL INFORMATION RECORDING MEDIUM

[75] Inventors: Tsutomu Satoh; Keiko Ichinose, both of Yokohama, Japan

[73] Assignee: Ricoh Company, Ltd., Tokyo, Japan

[21] Appl. No.: 941,061

[22] Filed: Dec. 12, 1986

[30] Foreign Application Priority Data

Dec. 12, 1985 [JP] Japan .................... 60-277882

[51] Int. Cl.$^4$ ............................. G03C 1/495
[52] U.S. Cl. ..................... 430/272; 430/275; 430/271; 430/945; 430/524; 430/530; 428/471; 369/283; 369/284; 369/285; 369/286
[58] Field of Search ............ 430/272, 275, 945, 524, 430/530; 428/471; 369/283, 284, 285, 286

[56] References Cited

U.S. PATENT DOCUMENTS 4,524,126 6/1985 Marinance et al. ............ 430/272 X

FOREIGN PATENT DOCUMENTS

| 0131548 | 8/1982 | Japan | 428/463 |
| 0188131 | 11/1983 | Japan | 430/272 |
| 1214161 | 9/1986 | Japan | 369/285 |
| 8402795 | 7/1984 | PCT Int'l Appl. | 369/284 |

*Primary Examiner*—Paul R. Michl
*Assistant Examiner*—Cynthia Hamilton
*Attorney, Agent, or Firm*—Oblon, Fisher, Spivak, McClelland & Maier

[57] ABSTRACT

An optical information recording medium is disclosed, which comprises a plastic substrate; an undercoat layer formed thereon, comprising a condensate of a mixture of (1) at least one metal alcoholate selected from the group consisting of a tetra-alkoxy metal and an organic tri-alkoxy metal, and (2) a polymeric compound selected from the group consisting of (i) a copolymer of an acrylate or methacrylate containing at least one hydroxy alkyl group, and an acrylate or methacrylate containing an alkyl group, and (ii) an amino-group-containing polymer; and a recording layer formed on the undercoat layer.

12 Claims, No Drawings

OPTICAL INFORMATION RECORDING MEDIUM

BACKGROUND OF THE INVENTION

The present invention relates to an optical information recording medium suitable for recording information therein and reproducing the same therefrom by application of laser beams, in particular, suitable for application of semiconductor laser beams.

Recently an information recording medium including an organic recording layer comprising an organic dye is attracting more attention than an information recording medium including a metallic recording layer comprising, for example, Te. This is because the organic recording layer is advantageous over the metallic recording layer in that (1) the melting point, decomposition temperature and thermal conductivity of organic dyes are much lower than those of metals such as Te, so that a recording medium including the organic recording layer can attain higher recording performance and higher recording density than the metallic recording layer, (2) the organic layer can be formed by coating and therefore is more suitable for mass production than the metallic coating layer and lower priced than the metallic recording layer, and (3) when the organic dye layer is formed on a substrate made of a plastic material, since the recording layer is similar in properties to those of the substrate, in particular, in the physical properties such as thermal expansion and water penetration, the occurrence of cracks in the recording layer and warping of the substrate can be reduced as compared with the case where the metallic recording layer is employed.

However, when an organic recording layer containing an organic dye is formed on a plastic substrate by coating, a solvent such as acetone and dichloroethane, in which the plastic substrate is highly soluble, is employed in a recording layer coating liquid. The result is that it becomes a problem that even the plastic substrate is dissolved in such solvent during coating.

Once the plastic substrate is dissolved in the solvent during the coating of the organic dye layer, even if the extent is extremely small, the reflection ratio of the organic layer cannot be increased any further. As a result, the above-mentioned advantages of the organic layer cannot be attained any longer. In order to avoid this problem, it has been proposed to use a solvent which does not dissolve the substrate. However, such a solvent has the drawbacks that the preservability and recording characteristics of the recording medium are impaired and pin holes are formed in the recording layer.

An inorganic recording layer comprising an inorganic material also has the drawbacks that the recording sensitivity is low because of the high thermal conductivity of the inorganic material contained in the recording layer and cracks are apt to be formed in the recording layer, because of much difference in the thermal expansion ratio and the expansion by water absorption between the inorganic recording layer and the organic substrate, by which recording error may be caused.

SUMMARY OF THE INVENTION

It is therefore an object of the present invention to provide an optical information recording medium from which the above-mentioned shortcomings of the conventional optical information recording medium have been eliminated, and which is improved on the resistance to a solvent of the substrate, with the defect ratio of the recording medium minimized, thereby maintaining high recording performance.

In order to attain the above object of the present invention, an optical information recording medium according to the present invention comprises a plastic substrate; an undercoat layer formed thereon, which comprises a condensate of a mixture of (1) at least one metal alcoholate selected from the group consisting of a tetra-alkoxy metal and an organic tri-alkoxy metal, and (2) a polymeric compound selected from the group consisting of (i) a copolymer of an acrylate or methacrylate containing at least one hydroxy alkyl group, and an acrylate or methacrylate containing an alkyl group, and (ii) an amino-group-containing polymer; and a recording layer comprising as the main component a polymethine dye formed on the above undercoat layer.

DETAILED DESCRIPTION OF THE PREFERRED EMBODIMENTS

As mentioned above, the optical information recording medium according to the present invention comprises a plastic substrate, an undercoat layer formed on the substrate, and a recording layer comprising as a main component a polymethine dye. When necessary, a protective layer can be formed on the above recording layer.

A pair of the thus fabricated recording mediums can be superimposed in such a manner that each recording layer comes to face each other so as to form an air space therebetween, so that a sealed air-sandwich type recording medium can be constructed. Alternatively, a sealed sandwich type recording medium can be constructed by tightly sealing a pair of the recording medium with the above-mentioned protective layer interposed therebetween.

In view of the production efficiency and cost, it is preferable that the plastic substrate for use in the present invention be manufactured by injection molding. When recorded information is reproduced by applying laser beams to the substrate, the substrate must be transparent to the employed laser beams. Representative examples of a material for such plastic substrate are acrylic resin, polycarbonate and polymethylpentane. Other conventional materials can also be employed for the plastic substrate. Further, on the surface of the substrate, a preformat for address signals and a pregroove for guide groove can be formed.

The undercoat layer to be formed on the plastic substrate comprises a condensate of a mixture of (1) at least one metal alcoholate selected from the group consisting of a tetra-alkoxy metal and an organic tri-alkoxy metal, and (2) a polymeric compound selected from the group consisting of (i) a copolymer of an acrylate or methacrylate containing at least one hydroxy alkyl group, and an acrylate or methacrylate containing an alkyl group; and (ii) an amino-group-containing polymer.

In the present invention, it is preferable that the metal alcoholate and the polymeric compound be mixed in a ratio by weight ranging from (99.9:0.1) to (20:80), more preferably, in a ratio by weight ranging from (90:10) to (40:60).

The above undercoat layer can be formed by dissolving the above mixture in water and organic solvents, coating the above mixture on the substrate and hardening the coated layer. A variety of organic solvents can be used for coating the undercoat layer, which depend on the composition of the above mixture. Representative examples of an organic solvent are an alcohol, solvent such as methanol and ethanol, a mixed solvent of an alcohol solvent and other solvents, such as a mixture of methanol and 1,2-dichloroethane. Of these solvents, ethanol is the most preferable for use. When a mixed solvent is employed, it is preferable that the alcohol solvent be in an amount of 50 wt.% or less, more preferably 30 wt.% or less, to the other solvent.

In order to accelerate the hardening of the coated layer, heat can be applied thereto. When necessary, an inorganic or organic acid or base can be added to the above mixture for the acceleration of the hardening of the coated layer. Furthermore, in order to adjust the refractive index and the coefficient of expansion of the undercoat layer, other metal alcoholates can be added to the above mixture.

It is preferable that the thickness of the undercoat layer be in the range of 100 to 3000 Å, more preferably in the range of 300 to 1500 Å.

As the metal alcoholate, silicon (Si) alcoholate, germanium (Ge) alcoholate, aluminum (Al) alcoholate, titanium (Ti) alcoholate, and zirconium (Zr) alcoholate can be employed. More specifically, as such metal alcoholate, a tetra-alkoxy metal having the formula,

$$M(OR)_4 \qquad (1)\text{-}1$$

an organic tri-alkoxy metal having the formula,

$$R^1 M(OR)_3 \qquad (1)\text{-}2$$

and condensates of these alkoxy metals can be employed.

In the above formulas, M represents Si, Ge, Al, Ti or Zr, R represents an alkyl group having 1 to 8 carbon atoms, an allyl group, or a phenyl or naphthyl group which may have a substituent selected from the group consisting of a hydroxyl group, an alkyl group having 1 to 8 carbon atoms, an alkoxyl group having 1 to 8 carbon atoms, halogen, a cyano group, a nitro group and an amino group; and $R^1$ represents an alkyl group having 1 to 8 carbon atoms, a vinyl group, an allyl group, or a phenyl group which may have a substituent selected from the group consisting of a hydroxyl group, an alkyl group having 1 to 8 carbon atoms, an alkoxyl group having 1 to 8 carbon atoms, halogen, a cyano group, a nitro group and an amino group.

Specific examples of the tetra-alkoxy metal represented by the above formula (1)-1 are tetra-alkyl (or tetra-allyl or tetra-aryl) orthosilicate and polyalkyl (or allyl or aryl) silicate, which include, for example, methyl orthosilicate, ethyl orthosilicate, n-propyl orthosilicate, n-butyl orthosilicate, n-octyl orthosilicate, phenyl orthosilicate, benzyl orthosilicate, phenethyl orthosilicate, allyl orthosilicate and methallyl orthosilicate, and polysilicates which can be produced by dehydration condensation of the above orthosilicates.

Specific examples of the organic tri-alkoxy metal having the above formula (1)-2 are methyl trimethoxy metal, methyl triethoxy metal, methyl tributoxy metal, ethyl triethoxy metal, vinyl trimethoxy metal, vinyl triethoxy metal, phenyl trimethoxy metal and phenyl triethoxy metal, in which the metal is selected from the group consisting of Si, Ge, Al, Ti and Zr.

As copolymers to be used in combination with the above-mentioned metal alcoholates, the following copolymers can be employed which are prepared from (i) a hydroxy alkyl acrylate or hydroxy alkyl methacrylate having the formula of

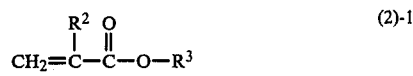

$$\underset{\underset{R^2}{|}}{CH_2}=C-\overset{O}{\underset{||}{C}}-O-R^3 \qquad (2)\text{-}1$$

wherein $R^2$ represents hydrogen or a methyl group, and $R^3$ represents an alkyl group having 2 to 6 carbon atoms including at least one hydroxyl group, and (ii) an alkyl acrylate or alkyl methacrylate having the formula of

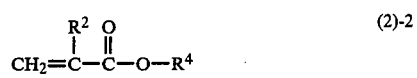

$$\underset{\underset{R^2}{|}}{CH_2}=C-\overset{O}{\underset{||}{C}}-O-R^4 \qquad (2)\text{-}2$$

wherein $R^2$ represents hydrogen or methyl group, and $R^4$ represents an alkyl group having 1 to 18 carbon atoms.

In addition to the above copolymers, and amino-group-containing polymer can also be employed.

Specific examples of the compounds having the formula (2)-1 are 2-hydroxyethyl acrylate, 2-hydroxy ethyl methacrylate, hydroxypropyl acrylate, hydroxypropyl methacrylate, hydroxybutyl acrylate, hydroxybutyl methacrylate, glycerol monoacrylate and glycerol monomethacrylate. Examples of the condensates thereof are polyethylene glycol acrylate, and polyethylene glycol methacrylate.

Specific examples of the compounds having the formula (2)-2 are methyl acrylate, methyl methacrylate, butyl acrylate, butyl methacrylate, octyl acrylate, octyl methacrylate, ethylhexyl acrylate, ethylhexyl methacrylate, lauryl acrylate, and lauryl methacrylate.

Specific examples of an amino group containing polymer are polyamide resin such as nylon 6, nylon 66, nylon 610, nylon 612, nylon 11, nylon 12, copolymer nylon and monomer casting nylon, polyamino sulfone resin, guanamine resin, urethane resin, melamine resin, and urea resin.

The undercoat layer according to the present invention comprises a mixture of the above-mentioned metal alcoholate and the polymer, which constitute an inorganic oxide layer containing an organic polymeric chain network therein, exhibiting properties between those of inorganic material and organic material. Because of such construction of the undercoat layer, the reduction of the recording performance of the recording medium is minimized and thermal expansion coefficient and water absorption distortion ratio are made close to those of the substrate. In addition to the above advantages, the formation of pin holes in the undercoat layer can be minimized.

A recording layer for use in the present invention is formed by coating, which comprises as the main component polymethine dye such as cyanine dye, merocyanine dye, croconium dye and pyrylium dye. Specific examples of such polymethine dye are as follows:

(a) Cyanine Dye $R^2$, $R^3$, $R^4$, $R^5$, $R^6$ and $R^7$ may be same or different, and each represents a hydrogen atom, a halogen atom or an alkyl group; Y represents a dihydric residue having an atomic group required for completing a pentacyclic ring or a hexacyclic ring; $R^8$ and $R^9$ may be same or different, and each represents a substituted or unsubstituted alkyl group or a substituted or unsubstituted aralkyl group or alkenyl group; $Z^1$ and $Z^2$ each represent an atomic group required for completing a substituted or unsubstituted heterocyclic ring; $Z^3$ represents an atomic group required for completing a substituted or unsubstituted pentacyclic ring or hexacyclic ring, and said pentacyclic ring or hexacyclic ring may be condensed with an aromatic ring; $R^{10}$ represents a hydrogen atom or a halogen atom; $R^{11}$ and $R^{12}$ each represent a hydrogen atom, a halogen atom, a hydroxyl group, a carboxyl group, an alkyl group, or a substituted or unsubstituted

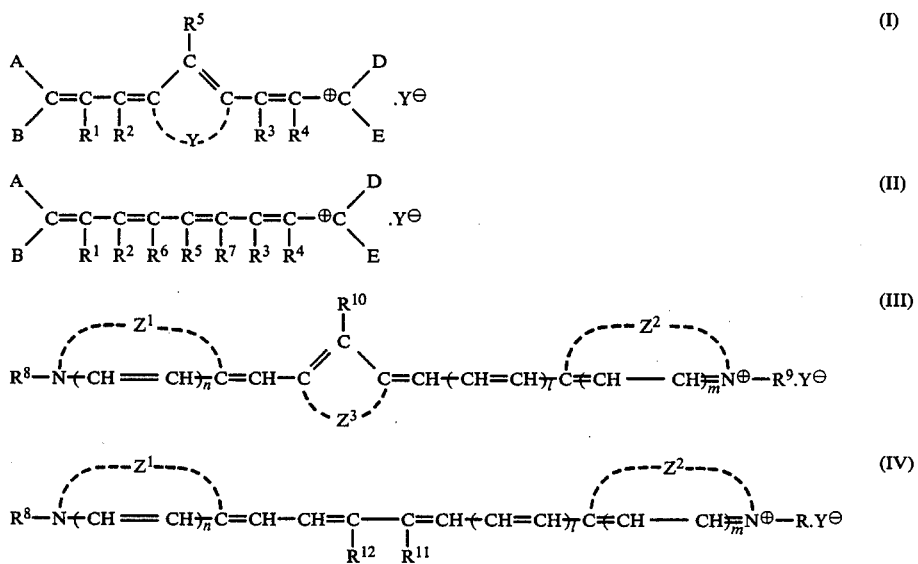

In the above formulas (I)–(IV), A, B, D and E each represent a substituted or unsubstituted aryl group; $R^1$, aryl group or acryloxy; and l, m and n each represent 0 or 1. Y represents an acid anion.

| Compound No. | A | B | D | E | R¹ | R² | R³ | R⁴ | R⁵ | Y | X⊖ |
|---|---|---|---|---|---|---|---|---|---|---|---|
| Formula (I)-1 | phenyl | phenyl | phenyl | phenyl | H | H | H | H | H | ⟩ | ClO₄ |
| Formula (I)-2 | phenyl | phenyl | phenyl | phenyl | H | H | H | H | Cl | ⟩ | ClO₄ |
| Formula (I)-3 | 4-N(CH₃)₂-phenyl | 4-N(CH₃)₂-phenyl | 4-N(CH₃)₂-phenyl | 4-N(CH₃)₂-phenyl | H | H | H | H | H | ⟩ | ClO₄ |
| Formula (I)-4 | 4-NO₂-phenyl | 4-NO₂-phenyl | 4-NO₂-phenyl | 4-NO₂-phenyl | H | H | H | H | H | ⟩ | ClO₄ |
| Formula (I)-5 | 4-OCH₃-phenyl | phenyl | 4-OCH₃-phenyl | phenyl | H | H | H | H | Br | ⟩ | ClO₄ |
| Formula (I)-6 | phenyl | 4-Cl-phenyl | phenyl | 4-Cl-phenyl | H | H | H | H | H | ⟩ | 4-CH₃-phenyl-SO₃ |
| Formula (I)-7 | 4-N(C₂H₅)₂-phenyl | 4-N(C₂H₅)₂-phenyl | phenyl | 4-Cl-phenyl | H | H | H | H | Cl | ⟩ | 4-CH₃-phenyl-SO₃ |

| Compound No. | | | | | R⁶ | R⁷ | | X⊖ |
|---|---|---|---|---|---|---|---|---|
| Formula (II)-1 | 4-N(C₂H₅)₂-phenyl | 4-N(C₂H₅)₂-phenyl | | 4-Cl-phenyl | H | H | | 4-CH₃-phenyl-SO₃ |

-continued
| Formula (II)-2 | | | | | | | | |
|---|---|---|---|---|---|---|---|---|
| —N(C₂H₅)₂ | 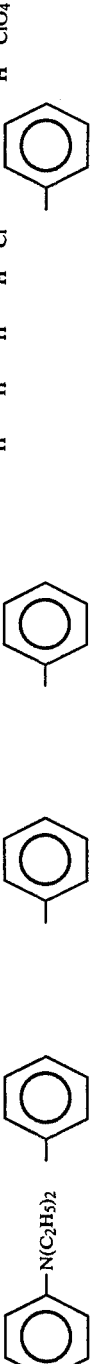 | 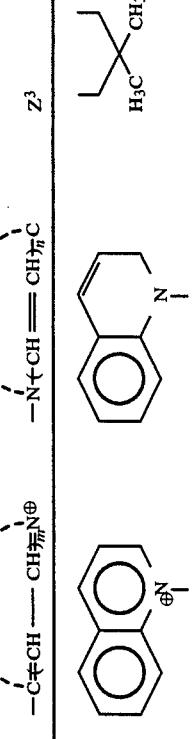 | 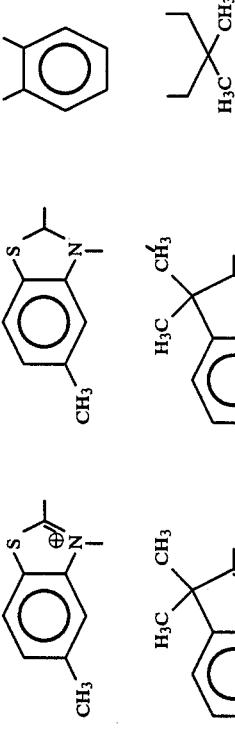 | H | H | H | Cl | H ClO₄ |
| Compound No. | Z² | Z¹ | Z³ | R⁸ | R⁹ | R¹⁰ | l | X⊖ |
|---|---|---|---|---|---|---|---|---|
| Formula (III)-1 | 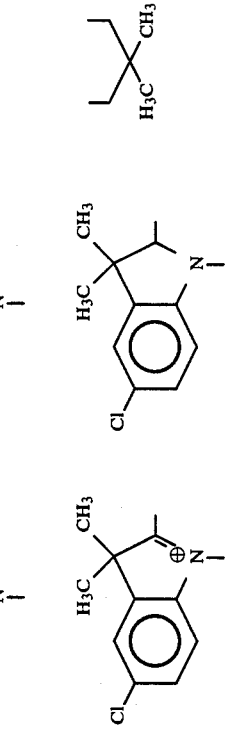 |  | 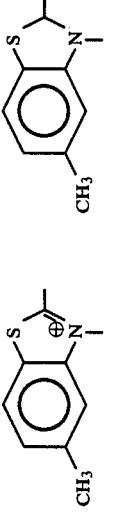 | CH₃ | CH₃ | H | 0 | I |
| Formula (III)-2 |  | 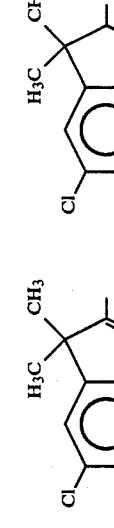 |  | C₄H₉ | C₄H₉ | Cl | 0 | Cl |
| Formula (III)-3 | 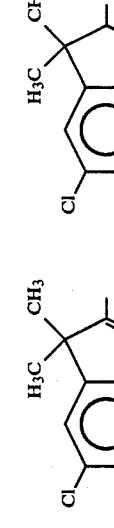 | 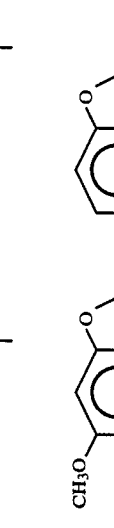 | 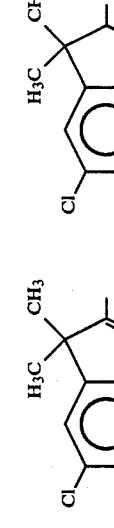 | C₂H₅ | C₂H₅ | H | 1 | I |
| Formula (III)-4 | 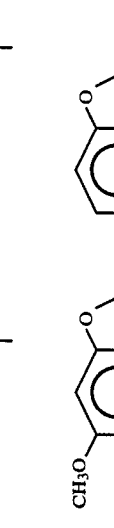 |  |  | C₂H₅ | C₂H₅ | H | 1 | I |
| Formula (III)-5 |  | | | C₂H₅ | C₂H₅ | H | 1 | I |

-continued

| | $Z^2$ | $Z^1$ | $R^8$ | $R^9$ | $R^{12}$ | $R^{11}$ | | $X^\ominus$ |
|---|---|---|---|---|---|---|---|---|
| Formula (III)-6 | naphtho-indolenium (2,2-diMe) | naphtho-indoline (2,2-diMe) | ) | C₂H₅ | C₂H₅ | H | — | I |
| Formula (III)-7 | indolenium (2,2-diMe) | indoline (2,2-diMe) | ) | C₂H₅ | C₂H₅ | Cl | — | I |
| Formula (III)-8 | indolenium (2,2-diMe) | indoline (2,2-diMe) | C(CH₃)₃ | C₂H₅ | C₂H₅ | H | —SO₃—C₆H₄—CH₃ (p-tolyl) | — |
| Formula (III)-9 | indolenium (2,2-diMe) | indoline (2,2-diMe) | ] | CH₃ | CH₃ | Br | SO₄—CH₃ | — |
| Formula (III)-10 | indolenium (2,2-diMe) | indoline (2,2-diMe) | ] | C₄H₉ | C₄H₉ | H | SO₄—C₂H₅ | — |
| Compound No. | $-C(CH=CH)_m-N^\oplus$ | $-N(CH=CH)_n-C$ | $R^8$ | $R^9$ | $R^{12}$ | $R^{11}$ | | $X^\ominus$ |

-continued

| | | | | | | | |
|---|---|---|---|---|---|---|---|
| Formula (IV)-1 | [benzoxazolium structure] | [benzoxazoline structure] | C₂H₅ | C₂H₅ | H | H | I | Cl |
| Formula (IV)-2 | [H₃C-C(CH₃) indolium structure] | [H₃C-C(CH₃) indoline structure] | CH₃ | CH₃ | H | H | I | Cl |
| Formula (IV)-3 | [quinolinium structure] | [quinoline structure] | C₅H₇ | C₃H₇ | H | H | I | Cl |
| Formula (IV)-4 | [CH₃O-benzothiazolium structure] | [CH₃O-benzothiazoline structure] | C₄H₉ | C₄H₉ | H | H | I | Cl |
| Formula (IV)-5 | [Br-benzoxazolium structure] | [Br-benzoxazoline structure] | CH₃ | CH₃ | H | H | I | I |
| Formula (IV)-6 | [Cl-H₃C-C(CH₃) indolium structure] | [Cl-H₃C-C(CH₃) indoline structure] | CH₃ | CH₃ | H | H | I | I |

-continued

| | | | | | | |
|---|---|---|---|---|---|---|
| Formula (IV)-7 | [structure] | [structure] | CH₃ | CH₃ | H | 1 | I |
| Formula (IV)-8 | [structure] | [structure] | C₂H₅ | C₂H₅ | H | 1 | $\text{–SO}_3\text{–C}_6\text{H}_4\text{–CH}_3$ |
| Formula (IV)-9 | [structure] | [structure] | C₃H₇ | C₃H₇ | H | 1 | $C_2H_5$—$SO_4$ |
| Formula (IV)-10 | [structure] | [structure] | CH₃ | CH₃ | Cl | 1 | $CH_3SO_4$ |
| Formula (IV)-11 | [structure] | [structure] | CH₃ | CH₃ | Cl | 0 | $ClO_4$ |

(b) Merocyanine Dye

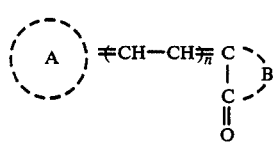

wherein

represents the following rings, the benzene ring and naphthyl ring of which may have a substitutent:

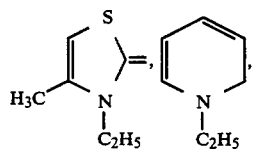

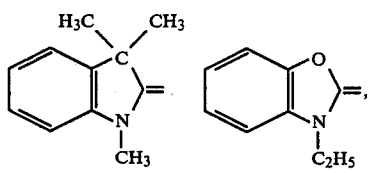

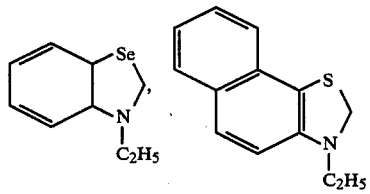

and the like;

represents the following rings;

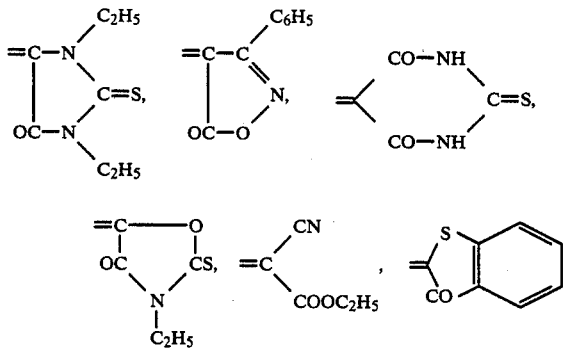

and n represents 1 or 2.

(c) Pyrylium Dye

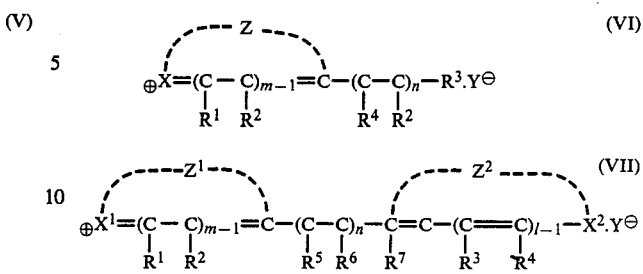

In the above formulas (VI) and (VII), X, $X^1$ and $X^2$ each represent a sulfur atom, an oxygen atom or a selenium atom; Z and $Z^1$ each represent a hydrocarbon group comprising an atomic group required for completing pyrylium, thiopyrylium, selenapyrylium, benzopyrylium, benzothiopyrylium, benzoselenapyrylium, naphthopyrylium, naphthothiopyrylium or naphthoselenapyrylium which may have been substituted; $Z^2$ represents a hydrocarbon group comprising an atomic group required for completing pyran, thiopyran, selenapyran, benzopyran, benzothiopyran, benzoselenapyran, naphthopyran, naphthothiopyran or naphthoselenapyran which may have been substituted; $R^1$, $R^2$, $R^3$ and $R^4$ each represent a hydrogen atom, a substituted or unsubstutued alkyl group or a substituted or unsubstituted aryl group; $R^5$, $R^6$ and $R^7$ each represent a hydrogen atom, a halogen atom, a substituted or unsubstituted alkyl group, a substituted or unsubstituted aryl group or a substituted or unsubstituted aralkyl group; m and l each represent 1 or 2; and n represents 0, 1 or 2. Y represents an acid anion.

The recording layer can be formed on the substrate by conventional coating method. It is preferable that the thickness of the recording layer be in the range of 100 Å to 10 μm, more preferably in the range of 200 Å to 2 μm.

As mentioned above, the recording layer for use in the present invention comprises as the main component the polymethine dye. However, in order to improve the recording characteristic and stability, two or more other dyes can be used in combination with the polymethine dye. Examples of such a dye are phthalocyanine dyes, tetrahydrocholine dyes, dioxazine dyes, triphenothiazine dyes, phenanthrene dyes, anthraqunone (indanthrene) dyes, xanthene dyes, triphenylmethane dyes, azulene dyes, squalium dyes and naphthoquinone dyes. In addition to the above dyes, metals such as In, Sn, Te, Bi, Al, Se, As and Cd, and metal compounds such as $TiO_2$ and SnO can be dispersed in the recording layer. Alternatively, a layer which include such dye, metal or metal compound can be separately formed on the recording layer.

Furthermore, the recording layer can contain other polymeric materials, stabilizer for storage (for example, metal complexes and phenolic compounds), dispersing agent, fire retardant additive, unguent, antistatic additive and plasticizer. A specific example of a stabilizer is bis(4-diethylaminodithiobenzyl)nickel.

As mentioned above, the recording layer can be formed on the substrate by a conventional coating method. Examples of such a conventional coating method are dip coating, spray coating, blade coating, spin coating, roller coating and curtain coating. At the time of coating, a suitable solvent is used depending upon a specific polymethine dye employed. Examples of a solvent for use at the time of coating are ketones such as methyl ethyl ketone, methyl isobutyl ketone, and cyclohexanone; esters such as butyl acetate, ethyl acetate, carbitol acetate, and butyl carbitol acetate; ethers such as methyl cellosolve and ethyl cellosolve; aromatic hydrocarbons such as toluene and xylene; and hologenated hydrocarbons such as dichloroethane.

In the present invention, a protective layer can be formed on the recording layer for various purposes. In order to protect the recording layer from being scratched and smeared with dust, a protective layer made of a polymeric material such as vinyl resin, polyamide resin, natural rubber and ionomer resin, a protective layer made of an inorganic compound such as $SiO_2$, $MgF_2$, SiO, $TiO_2$, ZnO, TiN and SiN, and a metallic protective layer made of a metal or a semi-metal such as An, Cu, S, Ni, Cr, Ge, Se, Al and Ag, can be used.

Further, in order to improve the reflection ratio of the recording layer, the above-mentioned metals, semi-metals, polymethine dyes and xanthene dyes having metallic luster can be employed in the protective layer.

When information is recorded in the optical information recording medium according to the present invention, laser beams for writing are used, by which physical changes or pits are formed in the recording layer. When recorded information is reproduced, laser beams for reading out is used to detect the changes in the reflection ratio of the recording layer, so that the recorded information is read out.

The present invention will now be explained in detail with reference to the following examples. Those examples are for illustrative explanation of the present invention, and as the matter of course, the scope of the present invention is not restricted by those examples.

EXAMPLE 1

10 parts by weight of ethyl orthosilicate, 87.5 parts by weight of ethanol and 15 parts by weight of a 0.05N hydrochloric acid were mixed, whereby an ethyl orthosilicate ethanol solution was prepared.

Apart from the above, 6 parts by weight of methyl methacrylate, 4 parts by weight of hydroxybutyl acrylate ($CH_2=CH-COOC_4H_8OH$), 0.1 part by weight of benzoyl peroxide, and 50 parts by weight of ethyl cellosolve were heated, with stirring, at a temperature of 80° C. in an atmosphere of nitrogen ($N_2$) for 10 hours to prepare a polymeric solution.

The above ethyl orthosilicate ethanol solution and the polymeric solution were mixed and the mixture was coated on a polymethyl methacrylate substrate (hereinafter referred to as the PMMA substrate) by spinner coating. The thus coated PMMA substrate was heated at 70° C. for 2 hours, and was then allowed to stand at room temperature for 1 day, whereby an undercoat layer having a thickness of about 900 Å was formed on the substrate.

On the thus formed undercoat layer, a 0.7 wt.% dichloroethane solution of the following Compound (A) was coated by spinner coating, whereby a recording layer having a thickness of about 600 Å was formed, so that an optical information recording medium No. 1 according to the present invention was prepared.

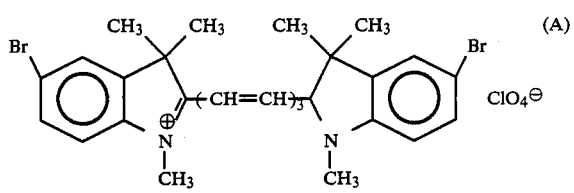

EXAMPLE 2

Example 1 was repeated except that the formulation of the polymeric solution employed in Example 1 was replaced by the following formulation, whereby an optical information recording medium No. 2 according to the present invention was prepared:

|  | Parts by weight |
| --- | --- |
| Butyl acrylate | 6 |
| 2-hydroxyethyl methacrylate ($CH_2=C(CH_3)-COOC_2H_4OH$) | 4 |
| Benzoyl peroxide | 0.1 |
| Ethyl cellosolve | 50 |

EXAMPLE 3

Example 1 was repeated except that the formulation of the ethyl orthosilicate ethanol solution employed in Example 1 was replaced by the following formulation, whereby an optical information recording medium No. 3 according to the present invention was prepared:

|  | Parts by weight |
| --- | --- |
| Ethyl orthosilicate | 6 |
| Methyl triethoxy silicate | 4 |
| Ethanol | 87.5 |
| 0.05 N hydrochloric acid | 15 |

EXAMPLE 4

Example 1 was repeated except that the formulation of the ethyl orthosilicate ethanol solution employed in Example 1 was replaced by the following formulation, whereby an optical information recording medium No. 4 according to the present invention was prepared:

|  | Parts by weight |
| --- | --- |
| Methyl orthosilicate | 6 |
| Methyl triethoxy silicate | 4 |
| Ethanol | 87.5 |
| 0.05 N hydrochloric acid | 15 |

EXAMPLE 5

Example 2 was repeated except that the Compound (A) employed in Example 2 was replaced by the following Compound (B), whereby an optical information recording medium No. 5 according to the present invention was prepared.

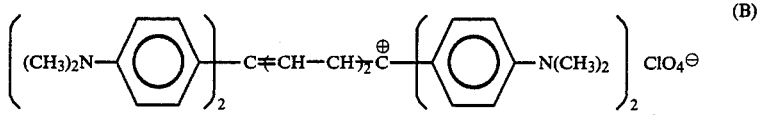 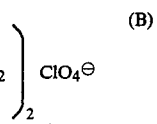

(B)

EXAMPLE 6

Example 1 was repeated except that 10 wt.% of bis(4-diethylamino dithiobenzyl) nickel was added with respect to the entire weight of the Compound (A) in the dichloroethane solution for coating the recording layer employed in Example 1, whereby an optical information recording medium No. 6 according to the present invention was prepared.

EXAMPLE 7

Example 1 was repeated except that the following Compound (C) was further deposited with a thickness of 100 Å on the recording layer by vacuum evaporation, whereby an optical information recording medium No. 7 according to the present invention was prepared.

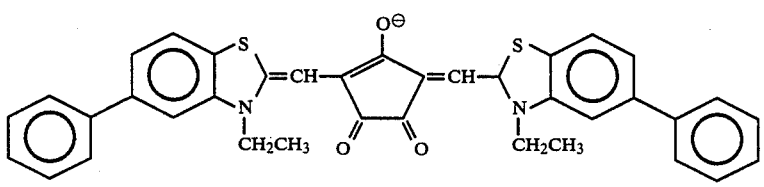

(C)

COMPARATIVE EXAMPLE 1

Example 1 was repeated except that the undercoat layer was prepared by use of only the ethyl orthosilicate ethanol solution employed in Example 1, whereby a comparative optical information recording medium No. 1 according to the present invention was prepared.

COMPARATIVE EXAMPLE 2

Example 3 was repeated except that the undercoat layer was formed by use of only the metal alcoholate components employed in Example 3, whereby a comparative optical information recording medium No. 2 accordiing to the present invention was prepared.

COMPARATIVE EXAMPLE 3

Example 3 was repeated except that the undercoat layer was formed by use of only the acryl copolymer components employed in Example 3, whereby a comparative optical information recording medium No. 3 according to the present invention was prepared.

COMPARATIVE EXAMPLE 4

Example 1 was repeated except that no undercoat layer was formed, whereby a comparative optical information recording medium No. 4 according to the present invention was prepared.

EXAMPLE 8

1 part by weight of ethyl orthosilicate, 7.5 parts by weight of ethanol and 1.5 parts by weight of a 0.05N hydrochloric acid were mixed to prepare an ethyl orthosilicate ethanol solution.

5 parts by weight of polyamide and 95 parts by weight of ethanol were mixed to prepare a polymeric solution.

The above ethanol solution and the polymeric solution were mixed. The mixture was applied to a PMMA substrate. The thus coated PMMA substrate was heated at 70° C. for 2 hours, and was then allowed to stand at room temperature for 1 day, whereby an undercoat layer having a thickness of about 900 Å was formed on the substrate.

On the thus formed undercoat layer, a 0.7 wt.% dichloroethane solution of the Compound (A) employed in Example 1 was coated by spinner coating, whereby a recording layer having a thickness of about 600 Å was formed, so that an optical information recording medium No. 8 according to the present invention was prepared.

EXAMPLE 9

Example 8 was repeated except that the polyamide employed in Example 8 was replaced by polyamino resin, whereby an optical information recording medium No. 9 according to the present invention was prepared.

EXAMPLE 10

Example 8 was repeated except that the formulation of the ethyl orthosilicate ethanol solution was replaced by the following formulation, whereby an optical information recording medium No. 10 according to the present invention was prepared.

|  | Parts by weight |
| --- | --- |
| Ethyl orthosilicate | 0.75 |
| Methyl triethoxy silicate | 0.75 |
| Ethanol | 7.5 |
| 0.05 N hydrochloric acid | 1.5 |

EXAMPLE 11

Example 8 was repeated except that the formulation of the ethyl orthosilicate ethanol solution was replaced by the following formulation, whereby an optical information recording medium No. 11 according to the present invention was prepared.

|                          | Parts by weight |
|--------------------------|-----------------|
| Methyl orthosilicate     | 2.0             |
| Methyl triethoxy silicate | 0.75           |
| Ethanol                  | 7.5             |
| 0.05 N hydrochloric acid | 1.5             |

EXAMPLE 12

Example 9 was repeated except that the Compound (A) employed in Example 9 was replaced by the Compound (B) employed in Example 5, whereby an optical information recording medium No. 12 according to the present invention was prepared.

EXAMPLE 13

Example 8 was repeeated except that 10 wt.% of bis(4-diethylamino dithiobenzyl) nickel was added with respect to the entire weight of the Compound (A) to the dichloroethane solution for coating the recording layer employed in Example 8, whereby an optical information recording medium No. 13 according to the present invention was prepared.

EXAMPLE 14

Example 8 was repeated except that the Compound (C) employed in Example 7 was further deposited with a thickness of 100 Å on the recording layer by vacuum evaporation, whereby an optical information recording medium No. 14 according to the present invention was prepared.

COMPARATIVE EXAMPLE 5

Example 8 was repeated except that the undercoat layer was prepared by use of only the ethyl orthosilicate ethanol solution employed in Example 8, whereby a comparative optical information recording medium No. 5 according to the present invention was prepared.

COMPARATIVE EXAMPLE 6

Example 10 was repeated except that the undercoat layer was formed by use of only the metal alcoholate components employed in Example 10, whereby a comparative optical information recording medium No. 6 according to the present invention was prepared.

COMPARATIVE EXAMPLE 7

Example 8 was repeated except that the undercoat layer was formed by use of only the polymeric solution containing the polyamide component employed, whereby a comparative optical information recording medium No. 7 according to the present invention was prepared.

COMPARATIVE EXAMPLE 8

Example 8 was repeated except that the metal alcoholate employed in Example 8 was eliminated, the polyamide employed in Example 8 was replaced by polyamino resin, and the Compound (A) was replaced by the Compound (B) employed in Example 5, whereby a comparative optical information recording medium No. 8 was prepared.

COMPARATIVE EXAMPLE 9

Example 8 was repeated except that no undercoat layer was formed, whereby a comparative optical information recording medium No. 9 was prepared.

Recording of optical information was performed on the substrate side of each of the above recording mediums according to the present invention and the comparative recording mediums by use of semi-conductor laser beams having a wavelength of 790 nm, with a recording frequency of 0.7 MHz, a line speed of 1.5 m/sec. Reproduction of the recorded information was performed by use of the same laser beams with a power of 0.2 mW, and the reflected light was subjected to spectral analysis by use of a scanning filter with a band width of 30 KHz, so that the C/N (Carrier/Noise) of each recording medium was measured.

Further, the optical recording mediums were subjected to an accelerated preservability test by allowing each recording medium to stand at 60° C., 90% R.H. for 500 hours. Thereafter, the reflection ratio and the C/N of each recording medium were measured.

When there was a portion whose reflection ratio was decreased by 20% or more within an unrecorded area in the recording medium, such a portion was judged to be a defective portion. In accordance with this judgement, a defective ratio was determined. The results are shown in the following Table 1.

TABLE 1

|  | Initial Values | | | Preservability Test | | |
|---|---|---|---|---|---|---|
|  | Recording Power (mW) | C/N (dB) | Defective Ratio ($\times 10^{-5}$) | Recording Power (mW) | C/N (dB) | Defective Ratio ($\times 10^{-5}$) |
| Example 1 | 2.7 | 53 | 6 | 2.7 | 50 | 9 |
| Example 2 | 2.7 | 52 | 7 | 2.7 | 50 | 11 |
| Example 3 | 2.7 | 53 | 5 | 2.7 | 49 | 9 |
| Example 4 | 2.7 | 53 | 6 | 2.7 | 50 | 11 |
| Example 5 | 2.8 | 52 | 8 | 2.7 | 48 | 12 |
| Example 6 | 2.8 | 51 | 5 | 2.8 | 49 | 10 |
| Example 1 | 2.8 | 52 | 11 | 2.8 | 48 | 23 |
| Comp. Example 1 | 3.0 | 54 | 23 | 3.0 | 40 | 343 |
| Comp. Example 2 | 3.6 | 54 | 18 | 3.0 | 38 | 436 |
| Comp. Example 3 | | | | | | |
| Comp. Example 4 | Impossible to form a recording layer due to the wearing away of the substrate during the coating of a recording layer coating liquid | | | | | |

TABLE 1-continued

| | Initial Values | | | Preservability Test | | |
|---|---|---|---|---|---|---|
| | Recording Power (mW) | C/N (dB) | Defective Ratio ($\times 10^{-5}$) | Recording Power (mW) | C/N (dB) | Defective Ratio ($\times 10^{-5}$) |
| Example 8 | 2.2 | 53 | 7 | 2.2 | 50 | 12 |
| Example 9 | 2.2 | 52 | 8 | 2.2 | 49 | 14 |
| Example 10 | 2.3 | 53 | 6 | 2.3 | 50 | 9 |
| Example 11 | 2.3 | 52 | 6 | 2.3 | 50 | 11 |
| Example 12 | 2.3 | 52 | 8 | 2.3 | 49 | 13 |
| Example 13 | 2.3 | 50 | 6 | 2.3 | 48 | 10 |
| Example 14 | 2.3 | 51 | 10 | 2.3 | 49 | 21 |
| Comp. Example 5 | 3.0 | 54 | 23 | 3.0 | 40 | 343 |
| Comp. Example 6 | 3.6 | 54 | 27 | 3.0 | 38 | 521 |
| Comp. Example 7 Comp. Example 8 Comp. Example 9 | | | Impossible to form a recording layer due to the wearing away of the substrate during the coating of a recording layer coating liquid | | | |

According to the present invention, an undercoat layer is obtained, which is able to minimize the reduction of the recording performance of the recording medium as compared with the conventional inorganic undercoat layer. Thus, an optical information recording medium having high stability can be obtained. Further, the recording layer can be formed on the injection molded substrate through the undercoat layer, so that the production cost can be significantly reduced.

What is claimed is:

1. An optical information recording medium comprising:
   a plastic substrate;
   an undercoat layer formed thereon, which comprises a condensate of a mixture of (1) at least one metal alcoholate selected from the group consisting of a tetra-alkoxy metal and an organic tri-alkoxy metal, and (2) a polymeric compound selected from the group consisting of (i) a copolymer of an acrylate or methacrylate containing at least one hydroxy alkyl group, and an acrylate or methacrylate containing an alkyl group, and (ii) an amino-group containing polymer; and
   a recording layer formed on said undercoat layer comprising as the main component a polymethine dye.

2. The optical information recording medium as claimed in claim 1, wherein said tetra-alkoxy metal is a metal alcoholate having the formula of:

$$M(OR)_4,$$

wherein M represents a metal selected from the group consisting of Si, Ge, Al, Ti and Zr, and R represents an alkyl group having 1 to 8 carbon atoms, an allyl group, or a phenyl or naphthyl group which is unsubstituted or substituted with a substituent selected from the group consisting of a hydroxyl group, an alkyl group having 1 to 8 carbon atoms, an alkoxyl group having 1 to 8 carbon atoms, halogen, a cyano group, a nitro group and an amino group.

3. The optical information recording medium as claimed in claim 1, wherein said organic tri-alkoxy metal is a metal alcoholate having the formula of:

$$R^1M(OR)_3,$$

wherein M represents a metal selected from the group consisting of Si, Ge, Al, Ti and Zr, and $R^1$ represents an alkyl group having 1 to 8 carbon atoms, a vinyl group, an allyl group, or a phenyl group which is unsubstituted or substituted with a substituent selected from the group consisting of a hydroxyl group, an alkyl group having 1 to 8 carbon atoms, an alkoxyl group having 1 to 8 carbon atoms, halogen, a cyano group, a nitro group and an amino group.

4. The optical information recording medium as claimed in claim 1, wherein said acrylate or methacrylate containing at least one hydroxy alkyl group has the formula of:

$$CH_2=\underset{R^2}{C}-\underset{O}{\overset{O}{C}}-O-R^3$$

wherein $R^2$ represents hydrogen or a methyl group, and $R^3$ represents an alkyl group having 2 to 6 carbon atoms and having at least one hydroxyl group.

5. The optical information recording medium as claimed in claim 1, wherein said alkyl acrylate or alkyl methacrylate containing an alkyl group has the formula of $$CH_2=\underset{R^2}{C}-\underset{O}{\overset{O}{C}}-O-R^4$$

wherein $R^2$ represents hydrogen or a methyl group, and $R^4$ represents an alkyl group having 1 to 18 carbon atoms.

6. The optical information recording medium as claimed in claim 2, wherein said metal alcoholate is selected from the group consisting of methyl orthosilicate, ethyl orthosilicate, n-propyl orthosilicate, n-butyl orthosilicate, n-octyl orthosilicate, phenyl orthosilicate, benzyl orthosilicate, phenethyl orthosilicate, allyl orthosilicate, and methallyl orthosilicate.

7. The optical information recording medium as claimed in claim 3, wherein said metal alcoholate is selected from the group consisting of methyl trimethoxy metal, methyl triethoxy metal, methyl tributoxy metal, ethyl triethoxy metal, vinyl trimethoxy metal, vinyl triethoxy metal, phenyl trimethoxy metal and phenyl triethoxy metal, in which said metal is selected from the group consisting of Si, Ge, Al, Ti and Zr.

8. The optical information recording medium as claimed in claim 4, wherein said acrylate or methacrylate containing at least one hydroxy alkyl group is selected from the group consisting of 2-hydroxyethyl acrylate, 2-hydroxy ethyl methacrylate, hydroxypropyl acrylate, hydroxypropyl methacrylate, hydroxybutyl acrylate, hydroxybutyl methacrylate, glycerol monoacrylate, and glycerol monomethacrylate.

9. The optical information recording medium as claimed in claim 5, wherein said acrylate or methacrylate containing an alkyl group is selected from the group consisting of methyl acrylate, methyl methacrylate, butyl acrylate, butyl methacrylate, octyl acrylate, octyl methacrylate, ethylhexyl acrylate, ethylhexyl methacrylate, lauryl acrylate, and lauryl methacrylate.

10. The optical information recording medium as claimed in claim 1, wherein the mixing ratio by weight of said metal alcoholate and said polymeric compound is in the ratio ranging from (99.9:0.1) to (20:80).

11. The optcal information recording medium as claimed in claim 1, wherein said recording medium comprises as the main component a polymethine dye selected from the group consisting of cyanine dyes, merocyanine dyes, croconium dyes and pyrylium dyes.

12. The optical information recording medium as claimed in claim 1, further comprising a protective layer which is formed on said recording layer.

* * * * *